United States Patent Office 3,152,132
Patented Oct. 6, 1964

3,152,132
QUINOLYL-BENZOTHIAZOLE COMPOUNDS
Ray Allen Clarke, Pitman, N.J., assignor to E. I. du Pont de Nemours and Company, Wilmington, Del., a corporation of Delaware
No Drawing. Filed July 2, 1962, Ser. No. 207,093
8 Claims. (Cl. 260—288)

The present invention is directed to new quinolylbenzothiazole compounds that are useful in the manufacture of a variety of dye types including disperse, cationic and direct dyes. Said compounds may be employed as intermediates for the dyes of my copending application (Serial No. 207,014), being filed simultaneouslyy with the present case.

The novel compounds of this invention are fluorescent brighteners for various substrates, including hydrophobic and cellulosic fibers.

The inventor faced the problem of providing valuable dye intermediates having the versatility mentioned above, and particularly of providing substantive, strong and bright green-yellow paper dyes. By substantive dyes we mean those of the direct dye type that may be applied to paper pulp, or cotton fiber, for example, without the use of rosin size and alum in the case of paper pulp.

It is, therefore, an object of the present invention to provide novel quinolyl-benzothiazole compounds which compounds have significant utility in the dye art as hereinafter described and claimed.

These and other objects will become apparent in the following description and claims.

More specifically, the present invention is directed to a compound of the formula

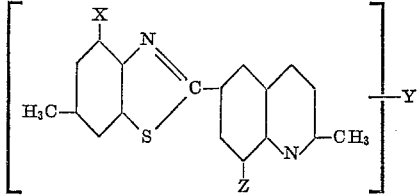

wherein X represents a member of the group consisting of hydrogen, and methyl, Z represents a member of the group consisting of hydrogen, metal and —SO$_3$M, Y represents a member of the group consisting of hydrogen and —SO$_3$M, and M represents a member of the group consisting of hydrogen, sodium and potassium. Preferred specific embodiments of my invention include:

(A) The compound:

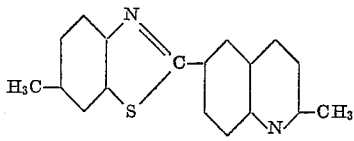

(B) The compound:

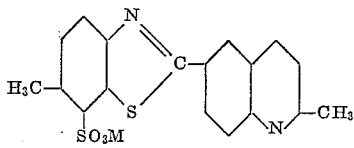

where M is defined as above;

(C) The compound:

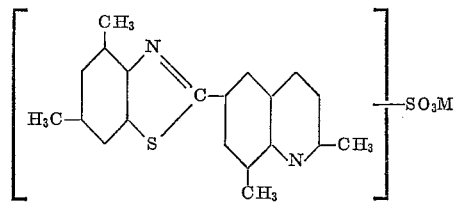

where M is defined as above.

Representative general routes may be employed to form the sulfonic acid derivatives included in the novel compounds of the present invention: (A) the aminothiazole compound is sulfonated, either in oleum or by well known amine-sulfate baking procedures, followed by reaction with paraldehyde; (B) the aminophenylbenzothiazole is sulfonated ortho to the amino group by the baking procedure, the resulting amino-sulfonic acid is converted to the quinolyl-benzothiazole.

Representative examples of the present invention follow:

*Example 1*

(A) 250 parts of an aqueous filter cake containing 160 parts of dehydrothio-p-toluidinesulfonic acid (obtained by sulfonating dehydrothio-p-toluidine in 25% oleum at 20° C.) are slurried in 414 parts of 31.6% hydrochloric acid with 21 parts of 5-nitro-o-toluenesulfonic acid (Para Acid) and 6 parts of CuCO$_4$·5H$_2$O. The mixture is heated to 100° C. and 50 parts of paraldehyde are added over a period of 4 hours. After stirring for 2 hours longer at 100° C. the reaction mass is cooled to room temperature and the reaction product is filtered off. The filter cake is washed with 18% aqueous hydrochloric acid to remove colored impurities, and the washed product is dried. It consists predominantly of the compound having the structure

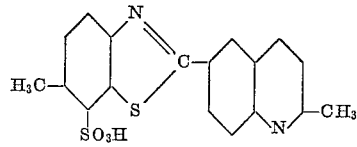

6-methyl-2-(2-methyl-6-quinolyl)-7-benzothiazolesulfonic acid

Said compound is a fluorescent brightener on hydrophobic and cellulosic fibers.

(B) The procedure described in part (A) of the present example is followed, except that the isomeric dehydrothio-p-toluidine sulfonic acid (obtained by baking the sulfate of dehydrothio-p-toluidine) is employed as the starting material. The reaction product is the monosulfonic acid of the formula:

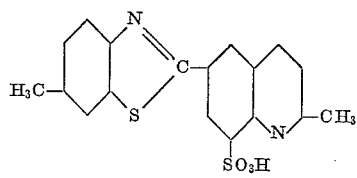

(C) The dehydrothio-p-toluidine sulfonic acid obtained by baking the sulfate of dehydrothio-p-toluidine is further sulfonated in oleum to provide a sulfo derivative which is predominantly a disulfonic acid. The latter is retracted with paraldehyde by the method of part (A) of this example to obtain the following compound:

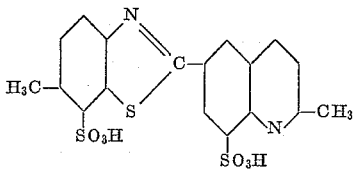

Example 2

(A) a mixture consisting of: 300 parts of 37% hydrochloric acid, 320 parts of isopropanol, 50 parts of water, 240 parts dehydrothio-p-toluidine, 42 parts of 5-nitro-o-toluenesulfonic acid and 12 parts $CuSO_4 \cdot 5H_2O$ is agitated at refluxing temperature (86° C.) while adding 100 parts of paraldehyde over a period of 4 hours. The reaction mixture is then diluted with 200 parts of isopropanol, and is cooled to room temperature with stirring. The precipitated hydrochloride of the condensation product is filtered off, washed with about 400 parts of isopropanol and dried. It is represented by the formula

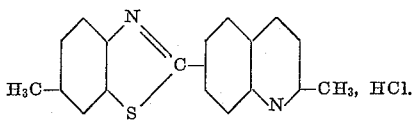

6-methyl-2-(2-methyl-6-quinolyl)benzothiazole and exhibits fluorescent brightener properties on hydrophobic substrates such as cellulose acetate or polyester fibers.

Example 3

(A) The procedure of Example 2 (A) is followed except that the 240 parts of dehydrothio-p-toluidine [2-(p-aminophenyl)-6-methylbenzothiazole] is replaced by 240 parts of the substituted phenylbenzothiazole obtained in the sulfur fusion of 2,4-xylidine at 180° to 220° C. The tetra-methyl derivative of the following formula is obtained

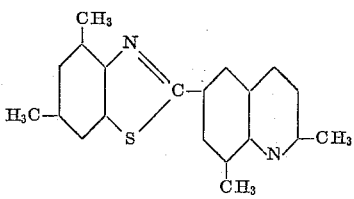

4,6-dimethyl-2-(2,8-dimethyl-6-quinolyl)benzothiazole (B) In an alternate method, the dehydrothio-p-xylidine starting matherial used in part (A) is first sulfonated by any convenient method, e.g. in 20% oleum at room temperature, and then condensed with paraldehyde by the procedure of Example 1 (A).

The 2-(p-aminophenyl)-6-methylbenzothiazole starting materials, which include said compound as well as its methyl and/or sulfo derivatives, can be mixed in any proportion and used in the reaction with paraldehyde to form mixtures of the quinolyl benzothiazoles which are variously substituted by methyl groups or by methyl and sulfo groups.

In the sulfur fusion of the aromatic amines to form the 2-(p-aminophenyl)-6-methylbenzothiazoles (compare Example 3 (A)) one can employ a mixture of unlike amines, e.g. p-toluidine and 2,4-xylidine, to obtain random substitution with respect to the methyl groups. The 2-methylquinolyl derivatives of these benzothiazoles are also useful as brightening agents and dye intermediates.

Crotonaldehyde may be employed in lieu of paraldehyde in the reaction to form the quinolyl derivative.

In the representative examples of this invention, the sulfo compounds are shown in their free acid form. It will be obvious that these acids may be neutralized with sodium or potassium hydroxides or carbonates and isolated from aqueous salt suspensions in the form of their sodium or potassium sulfonates.

Numerous uses for the novel quinaldine derivatives have been noted in this specification. Said quinaldine derivatives may be reacted with phthalic anhydride to produce the quinophthalone derivative described in my copending application Serial No. 207,014 filed of even date.

Furthermore, the novel quinaldine compounds of this invention, either as the free base or sulfo derivative is fluorescent. Accordingly, the free base could be applied to hydrophobic fibers, such as acetate or "Dacron" polyester fiber as a fluorescent brightener. The sulfo-derivative is useful as a fluorescent agent on cellulosic materials.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. The compound

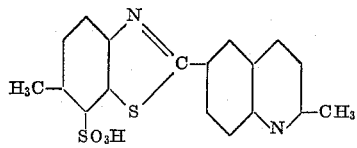

2. A compound of the formula

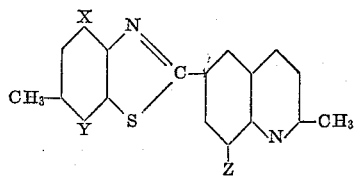

wherein X is selected from the group consisting of H and $CH_3$; Y is $SO_3M$; Z is selected from the group consisting of H, $CH_3$ and $SO_3M$ and M is selected from the group consisting of H, Na and K.

3. The compound

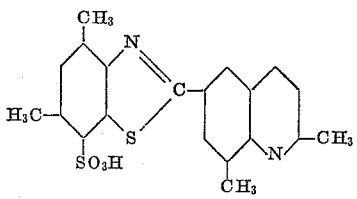

4. The compound

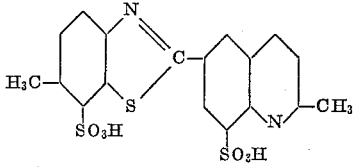

5. A process for producing a compound having the formula

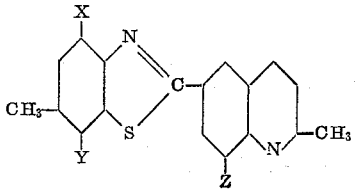

which comprises heating a compound of the formula

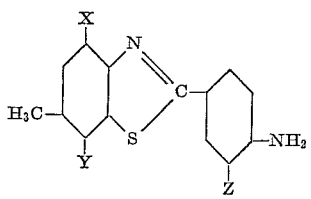

wherein X is selected from the group consisting of H and CH₃; Y is selected from the group consisting of H and SO₃H; and Z is selected from the group consisting of H, CH₃ and SO₃H, with at least 0.6 moles of paraldehyde per 1 mole of the aminophenylbenzothiazole compound in an acidic medium in the presence of an oxidizing agent at temperatures in the range of from about 75° to 110° C.

6. A process for producing a compound having the formula

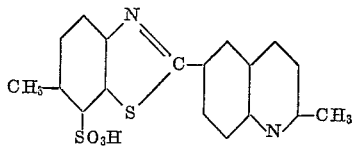

which comprises heating a compound of the formula

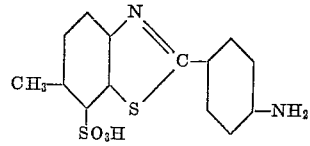

with at least 0.6 mole of paraldehyde per 1 mole of the aminophenylbenzothiazole compound in an acidic aqueous medium in the presence of an oxidizing agent at temperatures in the range of from about 75° to 110° C.

7. A process for producing a compound having the formula

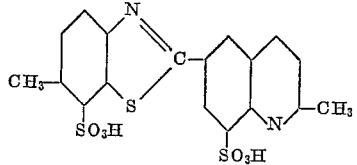

which comprises heating a compound of the formula

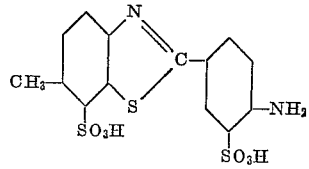

with at least 0.6 mole of paraldehyde per 1 mole of the aminophenylbenzothiazole compound in an acidic aqueous medium in the presence of an oxidizing agent at temperatures in the range of from about 75° to 110° C.

8. A process for producing a compound having the formula

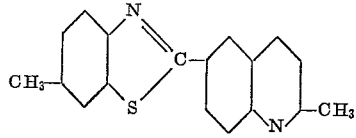

which comprises heating a compound of the formula

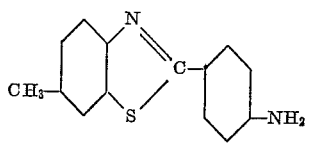

with at least 0.6 mole of paraldehyde per 1 mole of the aminophenylbenzothiazole compound in an acidic aqueous medium containing an inert organic diluent in the presence of an oxidizing agent at temperatures in the range of from about 75° to 110° C.

References Cited in the file of this patent
UNITED STATES PATENTS

| | | |
|---|---|---|
| 2,121,320 | Kranzlein et al. | June 21, 1938 |
| 2,592,370 | Zwelgmeyer | Apr. 8, 1952 |

FOREIGN PATENTS

| | | |
|---|---|---|
| 522,059 | Germany | Mar. 19, 1931 |

OTHER REFERENCES

Meyer: Chem. Abs., vol. 16, col. 2128 (1922).
Elderfield: Heterocyclic Compounds, vol. 4, pp. 10 and 18 (1952).